United States Patent Office
3,462,403
Patented Aug. 19, 1969

3,462,403
POLYMERIZATION CATALYST COMPRISING (1) TRANSITION METAL AMIDE, (2) $ZnR_2$ OR $ZnCl_2$ AND (3) ZIEGLER CATALYST OR ZIEGLER CATALYST REDUCING COMPONENT
John F. Pendleton, Park Ridge, Ill., assignor, by mesne assignments, to Columbian Carbon Company, a corporation of Delaware
No Drawing. Filed May 11, 1964, Ser. No. 366,659
Int. Cl. C08f 1/56, 1/42, 1/52
U.S. Cl. 260—93.7                                    20 Claims

ABSTRACT OF THE DISCLOSURE

This disclosure is concerned with a novel three component catalyst system useful in the polymerization of polymerizable unsaturated monomers. This new catalyst composition is an admixture of (1) a transition metal amide (2) a material of the group consisting of (i) a Ziegler polymerization catalyst reducing component and (ii) said reducing component and a Zeigler polymerization catalyst transition metal compound other than said amide, and (3) a zinc compound.

---

This invention relates to a catalyst composition and methods of preparing the same, and to processes of catalyzing the polymerization of unsaturated organic monomers by means of such compositions.

An object of this invention is the polymerization of alpha olefins to highly crystalline products using, as a catalyst, a reducing component of a Ziegler polymerization catalyst, or normal and modified Ziegler catalysts, in conjunction with a Group IV–B, V–B or VI–B metal amide, or a manganese amide, an example being tetrakis-diethylaminotitanium (referred to hereinafter as TDET). The preferred amides are those of Ti, V, Cr, and Zr, but the invention is not limited to the amides of these metals.

A further object of this invention is the polymerization of ethylene, propylene, butadiene, and other polymerizable monomers with new catalysts produced from the interaction of (1) a metal of periodic Groups I–A, II–A, II–B, III–A (including boron), or IV–A, or a reducing compound of these metals such as triethylaluminum, and (2) a Group IV–B, V–B, or VI–B metal amide, or a manganese amide, such as TDET.

An additional object of this invention is the production of highly crystalline polymers using the catalysts of this invention.

Another object of the invention is to provide the above-described catalysts, and methods of polymerizing unsaturated compounds therewith.

While such amides have been synthesized by others in the art, their use as components in a Ziegler polymerization catalyst system is a further novel feature of the invention.

The amides within the contemplation of this invention have the following general formula $$M[NR_2]_x$$

wherein M is a transition metal as defined elsewhere in the specification, R is selected from the group consisting of hydrogen and a hydrocarbyl radical, substituted or unsubstituted, including alkyl, aryl, alkaryl, aralkyl, and halogen substituted derivatives thereof, and $x$ represents the valence state of the metal M.

The transition metal is desirably one of the metals of Groups IV–B, V–B, or VI–B of the periodic chart of the elements, or manganese. Preferably, the transition metal is titanium, vanadium, chromium, or zirconium.

Suitable alkyl and substituted alkyl radicals include methyl and ethyl, which are the preferred radicals according to the invention, propyl, n-butyl, isobutyl, pentyl, hexyl, heptyl, octyl, dodecyl and chloroethyl. It is desirable that the hydrocarbyl and substituted hydrocarbyl radicals have less than 15 carbon atoms. Other useful radicals include phenyl 4-chlorophenyl, 4-methylphenyl, and benzyl.

The useful amides include, for example, tetrakis (diethylamino) titanium, tris(diethylamino) titanium, pentakis(dimethylamino) vanadium, tris(dipropylamino) vanadium, hexakis(dimethylamino chromium), tris(dibutylamino) chromium, tetrakis(diethylamino) manganese, tetrakis(dimethylamino) zirconium, pentakis(diethylamino) niobium and hexakis(diethylamino) molybdenum. Other suitable amides will be apparent.

TDET is suitably prepared according to the procedure of Bradley and Thomas (J. Chem. Soc.) 1960, p. 3857. Briefly, diethylamine is added to butyllithium to form lithium diethylamide. Addition of titanium tetrachloride to this solution gives, instead of the reported clear yellow solution over the precipitate of lithium chloride, a heterogeneous brown suspension. Removal of solvent yielded a brown-black slurry. The product may be filtered and distilled, or purified by other methods. The same procedure is useful for preparing the analogous compounds of the transition metals other than titanium. While it is preferred to remove the alkali metal halide precipitate before preparing and using the polymerization catalyst of the invention, it is not essential to do so.

The same transition metals are useful for the amides of the invention as are useful for the transition metal compound of the Ziegler catalysts. More specifically, these transition metals include titanium, zirconium, hafnium, thorium, vanadium, niobium, tantalum, chromium, molybdenum selenium, tungsten, tellurium, uranium and manganese. Manganese and the Group IV–B, V–B, and VI–B transition metals are generally preferred, although other transition metals are useful. The especially preferred group consists of titanium, zirconium, vanadium, niobium, chromium, and manganese, which are brittle transition metals having an atomic weight of less than about 93. In this specification the classification of the elements is based on the long or Bhor periodic chart of the elements, and more specifically Deming's chart as it appears at pages 58 and 59 of Lange's Handbook of Chemistry, 7th ed., 1949, with the exception that boron is classified herein as being a metal. The transition metal may be at its maximum valence state or at a lower valence state prior to admixture with the reducing component.

Various compounds are useful as the transition metal compound of the Ziegler catalysts with which, in one embodiment, the transition metal amides are utilized.

Thus, the halogen acid salts, such as of titanium, zirconium, chromium, thorium, and uranium are effective. Transition metal compounds or complexes which are generally used include the halides oxychlorides acetylacetonates alcoholates, oxides, and complex halides such as the fluotitanates.

The alcoholates of titanium, zirconium, hafnium and thorium for example tetrabutyltitanate and tetraethylzirconate, the halogen-containing alcoholates for example dichlorodiethyltitanates and monochlorodiethyl zirconate, the complexes prepared from amino alcohols, for example monoethanolamine titanate and triethylolamine titanate, the salts of organic monobasic acids for example titanium acetate and zirconium propionate and the complexes with alkali metal organic dibasic salts for example sodium titanium malonate and potassium titanium oxalate, are useful as catalysts for the polymerization of for instance ethylene and higher alpha olefins in conjunction with the Ziegler reducing agents described above. Complex salts of titanium, zirconium and hafnium halides and a halide of an alkali metal or ammonium, for example potassium fluotitanate, cesium fluozirconate, and ammonium chlorotitanate, are effective catalyst components in ethylene and alpha olefin polymerization or copolymerization.

Complex salts of molybdenum, tungsten, uranium, selenium, tellurium, chromium and polonium are active catalysts in ethylene and alpha olefin polymerization in combination with a reducing component such as a hydride or organometallic compound. Complex salts include, for example, molybdenum oxydihydroxydichloride, potassium molybdenum hexachloride, ammonium tungsten tetrafluoride and cesium trimolybdenum hexaoxyheptachloride.

A wide variety of the prior art Ziegler catalyst systems and reducing components are useful with the transition metal amides of the present invention.

Alpha olefin polymerization catalysts involving a two component Ziegler catalyst arising from the interaction of a reducing component with transition metal derivatives are well known. For example triethylaluminum-titanium trichloride is taught by Belgian Patent 549,638 and diethylaluminum chloride-titanium trichloride and triethylaluminum-vanadium trichloride are taught by Belgian Patent 543,259.

Belgian Patent 589,260 describes the use of amines, (primary, secondary and tertiary amines), as modifiers in the catalyst system triethylaluminum-titanium trichloride, for the production of polypropylene with higher crystallinities than that obtained with triethylaluminum and titanium trichloride alone.

Belgian Patent 585,112 describes the use of amides of aluminum, berylium, magnesium and lithium, in lieu of the metal alkyl derivatives, together with transition metal derivatives as catalysts for polymerization of α-olefins.

Chemical Week, Mar. 25, 1961, page 9, teaches that high density syndiotactic or stereosymmetric polypropylene is produced when tris-N,N-dimethylphosphoramide is used as a modifier and/or as an activator for a Ziegler system. The catalyst systems used in conjunction with the phosphoramide were titanium and aluminum powder treated with carbon as taught by U.S. Patent 2,969,346; ethylaluminum dichloride-titanium trichloride as taught by U.S. 2,969,345 and ethylaluminum sesquihalides with titanium trichloride or titanium tetrachloride as taught by U.S. Patent 2,956,991. These patents teach that polymers were not obtained with the unmodified catalyst but highly crystalline polypropylenes were obtained when the phosphoramide were added. The phosphoramide was also used to increase the crystallinity of the polypropylenes obtained from amyl sodium, butyl lithium or ethyl magnesium when used with titanium tetrachloride as taught by U.S. Patent 2,958,688.

The above described catalysts of the prior art generally fall into a class described as "Ziegler catalysts" which are effective for the polymerization of ethylene to linear, high density, high molecular weight polyethylene and the stereospecific polymerization of other alpha olefins to crystalline stereoisomeric polymers. These catalysts are generally heterogeneous, containing a solid phase. The solid phase in some cases is microcrystalline and exists as a colloidal solution.

Many of the Ziegler type catalysts and reducing agents within the scope of this invention are discussed by Gaylord and Mark, Linear and Stereoregular Addition Polymers, Interscience Publishers Incorporated, New York (1959), however, the catalysts of this invention are not limited to those mentioned in this publication.

Other disclosures of suitable polymerization catalyst systems included in this invention appear for example in Belgian Patents 533,362; 534,888; 534,792; 538,782; and 534,941. The reducing components disclosed in these patents can also be used in the present invention.

Other examples of Ziegler polymerization catalysts are well known to those skilled in the art.

The term "reducing component of a Ziegler polymerization catalyst" as used throughout the specification is intended to mean a non-transition metal or compound thereof, said metal occurring in Groups I–A, II–A, II–B, III–A, and IV–A of the periodic table which is capable of forming a catalyst system for the polymerization of alpha olefins, when mixed with a suitable compound of certain transition metals, such transition metals being described elsewhere herein. For the purpose of this application, boron is classified as a non-transition metal or representative metal.

The reducing components are capable of acting as reducing agents, preferably under anhydrous conditions. The preferred compounds are organic compounds of non-transition metals as identified above, or hydrides or complexes obtained from such compounds. By an "organic compound" of the metal or "organometallic" is meant a compound having at least one organic radical, preferably a hydrocarbyl radical, attached by means of a carbon atom to an atom of the non-transition metal, any remaining metal valencies being satisfied by hydrogen or halogen atoms. Suitable hydrocarbon radicals include alkyl, alkenyl, alkynyl, cycloalkyl, aryl and aralkyl radicals having up to about 20 carbon atoms, of which alkyl is preferred. Other examples of organometallic compounds are complexes formed from organo aluminum compounds and alkali metal compounds, for example triethyl aluminum sodium hydride. Examples of reducing components not containing organic radicals are lithium hydride and lithium borohydride.

The reducing compounds of metals in periodic Group III–A, such as aluminum, are particularly valuable reducing components for use in the process of the present invention. A wide range of such compounds can be represented by the formula $R_2AlX$ where R is hydrogen or a hydrocarbon radical and X is hydrogen, halogen, a hydrocarbon radical, an alkoxy radical, an aryloxy radical or a radical derived from a secondary amine, from a secondary acid amide, from a mercaptan, from a carboxylic acid or from a sulfonic acid. Examples of such aluminum compounds are triethyl aluminum, tripropyl aluminum, tridodecaluminum, triisobutyl aluminum, aluminum hydride, ethyl aluminum dihydride, diethyl aluminum hydride, diethyl aluminum chloride, ethyl aluminum dichloride, diisobutyl aluminum chloride, dibutyl aluminum fluoride, methoxyaluminum dimethyl, triphenyl aluminum, diethyl phenyl aluminum, diethyl piperidyl aluminum, dimethylamino aluminum diethyl, and ethyl mercaptyl aluminum diethyl. The preferred reducing components are the aluminum trialkyls and the dialkyl aluminum halides.

Other suitable organometallic reducing compounds are the alkyl and aryl compounds of the metals lithium, sodium, magnesium, zinc, cadmium, aluminum, tin and lead. Specific compounds are tetraethyl lead, tetraethyl tin, diethyl cadmium, dibutyl zinc, dipropyl zinc, diethyl zinc, dimethyl zinc, dibutyl magnesium, dimethyl magnesium, phenyl sodium, n-butyl sodium, phenyl lithium and n-butyl lithium. Examples of organo-metallic compounds containing halogen atoms are Grignard compounds and the corresponding compounds of zinc, calcium and barium, e.g., phenyl magnesium bromide, propyl or butyl magnesium chloride, phenyl calcium iodide, and phenyl barium iodide.

The catalyst of the invention is either homogeneous or heterogeneous.

If the crude aminotitanium reaction product prepared in accordance with Bradley and Thomas [J. Chem. Soc. (1960) 3857] is vacuum distilled, the desired product tetrakis diethylamino titanium is obtained. This liquid with a reducing component such as triethyl aluminum, for instance in a ratio of 1 to 3 respectively, gives a two component homogeneous catalyst.

A three component polymerization catalyst comprising TDET, added to heterogeneous triethylaluminum-titanium tetrachloride catalyst, gives a final homogeneous catalyst. When TDET and titanium trichloride are mixed and triethylaluminum is then added, a heterogeneous catalyst is obtained.

Four component heterogeneous polymerization catalyst systems comprising triethylaluminum, titanium trichloride, TDET and either zinc chloride or diethyl zinc or other Group I, II and III metal alkyls and/or their salts are of benefit in polymerizing propylene. The effect of the addition of zinc alkyl or zinc salt is to increase the crystallinity.

The heterogeneous three component catalysts are suitably made by introducing the transition metal component such as titanium trichloride into the reaction vessel. If needed a suitable solvent is added and the transition metal amide is then added rapidly and the mixture stirred at room temperature for instance for 15 minutes. Triethylaluminum or other reducing component, in a solvent if necessary, is then added rapidly and the mixture stirred, for example, for 15 additional minutes.

In the four component heterogeneous catalysts employing either zinc chloride or diethyl zinc, a Ziegler catalyst including the reducing component and the transition metal compound and TDET can be ball-milled in order to reduce the particle size of the solid phase. As a general rule, the more finely divided the solids are, the more active the catalyst, i.e., the greater the quantity of polymer produced in a given time. Zinc chloride added to the catalyst appears to lower the molecular weight of polypropylene and other polymeric materials produced. It has been found that usually an increase in crystallinity can be expected if molecular weight is reduced somewhat.

In general, when using a heterogeneous catalyst system, the solid phase should be finely divided, and if necessary the components or catalyst mixture are subjected to the action of a grinder, attrition mill, ball-mill or other suitable device.

Ball-milling may be accomplished by placing the transition metal derivatives with a suitable solvent in stainless steel vial with stainless steel balls, and gyrating the vial for 3 minutes. Ball-winding $TiCl_3$ and TDET (and then adding $ZnCl_2$ and triethylaluminum) seems to give a superior catalyst compared to those prepared from ball-milling $TiCl_3$, TDET and $ZnCl_2$ plus triethylaluminum. Generally, the same results were observed from ball-milling titanium trichloride and TDET plus diethyl zinc and triethylaluminum.

It has also been found in the two component heterogeneous systems that the addition of $ZnCl_2$ to a mixture of $TiCl_3$ and TDET increases the crystallinity. Ball-milling the $TiCl_3$-TDET increases the crystallinity also, but ball-milling the three component mixture $TiCl_3$, TDET and $ZnCl_2$ together prior to the addition of triethylaluminum did not result in a proportionate crystallinity increase. Ball-milled $TiCl_3$-TDET plus normal ground $ZnCl_2$ produced a catalyst which was quite active.

Generally speaking, the catalysts prepared by the process of this invention have been found effective in the polymerization of alpha olefin monomers, for example vinyl and vinylidene monomers, such as ethylene and propylene, as well as diolefinic monomers such as butadiene.

Other unsaturated monomers within the scope of this invention include acenaphthalene, acrylonitrile, allene; allylsilane; allyltrimethylsilane; bicycloheptadiene; norbornene; butadiene; 1-butene; t-butyl acrylate; t-butyl methacrylate; 1-butyne; chloroprene; m-chlorostyrene; o-chlorostyrene; p-chlorostyrene; acetylene; 2,3-dimethylbutadiene-1,3; 2,3-dimethylene; 1,4-hexadiene; a,5-dimethyl-1,5-hexadiene; 2,4-dimethylstyrene; 2,5-dimethylstyrene; 3,4-dimethylstyrene; 3,5-dimethylstyrene; divinylbenzene; heptadiene-1,6; hexadiene-1; 1-hexene; 1-hexyne; indene; isobornyl acrylate; isobornylmethacrylate; isobutylene; isopropylacrylate; p-isopropyl styrene; 3-methyl-1-butene; 2-methyl-4-fluorostyrene; 4-methyl-1-hexene; 1,5-cyclooctadiene; 5-methyl-1-hexene; methylmethacrylate; 2-methylpentadiene-1,3; 4-methyl-1-pentene; m-methylstyrene; o-methylstyrene; p-methylstyrene; pentadiene-1,3; 1-pentene; phenylacetylene; piperylene; styrene; vinyl acetate; vinyl acetonitrile; vinylallyl ether; vinylbenzyl ether; 4-vinylbiphenyl; vinyl-n-butyl ether; vinyl-t-butyl ether; vinyl chloride; 1-vinyl-4-chloronaphthalene; 4-vinylcyclohexene; vinylethyl ether; vinylisobornyl ether; vinylisobutyl ether, vinylisopropyl ether; vinylmethyl ether; vinylmonochloroacetate; 1-vinylnaphthalene; 2-vinylnaphthalene; 9-vinylphenanthrene; vinylpropylether; vinyl stearyl ether; vinyl-α-terpinyl ether; 6-vinyl - 1,2,3,4 - tetrahydronaphthalene; vinyltrifluoroacetate.

The polymerization process of this invention includes these monomers and others as well as copolymers of any two, three, or more of these monomers and/or other monomers. The unsaturated monomers preferably have olefinic unsaturation and from 2 to about 20 carbon atoms. A preferred group has 2 to 5 carbon atoms with one double bond or more, including compounds with two conjugated double bonds, and specifically including ethylene, propylene, isoprene, chloroprene, and butadiene.

The homogeneous triethyl aluminum TDET catalyst has been used to polymerize ethylene. It was noted that the more active catalysts were obtained at aluminum to titanium ratios greater than 1 but less than 3 to 1. The amount of polymer produced was found to be dependent on catalyst concentration. Polyethylene obtained in all cases was of the high molecular weight fibrous type.

The three-component heterogeneous catalyst system TDET-$Et_3$Al-$TiCl_3$ is an effective catalyst for the polymerization of propylene. The addition of TDET increases the crystallinity of the propylene polymer, as compared to a catalyst consisting of triethyl aluminum and titanium trichloride alone.

These TDET modified catalyst systems are more sensitive toward the alkyl aluminum to titanium trichloride ratio than the normal triethyl aluminum-titanium trichloride catalyst system used in propylene polymerization. Maximum crystallinities are obtained at a ratio of about 3:1:1 $Et_3$Al:$TiCl_3$:TDET. Other ratios, such as 4:1:0.5, 2:1:1 and 3:1:1.5 are useful.

An increase in crystallinity accompanies an increase in catalyst concentration but generally it has been observed that there is more than a proportionate increase in yield per gram of catalyst charged. Generally speaking, doubling the catalyst concentration will quadruple the yield of polymer for this particular three component catalyst system.

In the polymerization of propylene utilizing a ball-milled catalyst employing triethyl aluminum, titanium trichloride and TDET it was generally observed that upon increasing the amount of TDET in the catalyst, the yield of polymer decreased as did the maximum initial temperature of the reaction but this was accompanied by an increase of the IRCR (infrared crystallinity ratio).

The molar ratio of the Ziegler reducing component to the transition metal amide is between about 1:5 and 20:1, preferably between 1:2 and 3:1. Where a conventional Ziegler transition metal compound is also present, the ratio of reducing component to Ziegler transition metal compound is between about 1:5 and 20:1, and the ratio of Ziegler transition metal compound to transition metal amide is between 1:5 and 5:1, preferably between 2:1 and 2:3. Examples of suitable molar ratios of reducing component:Ziegler transition metal compound: transition metal amide are between 1:0:1 and 20:0:1 and between 1:1:1 and 20:1:1, specific examples being 3:1:1, 6:2:1, 2:2:1, 6:2:3, 1:0:1, 3:0:1, and 2:0:1.

A suitable time for the reaction is between about 0.05 and 72 hours. The reaction may be conducted with or without a solvent, although when the catalyst is prepared in advance of contact with the monomer, a solvent is usually present from the catalyst preparation step. Commonly used solvents include hexane, benzene, ethyl chloride, toluene, chlorobenzene and others known to the art. The polymerization temperature is maintained at one or more points between about −50° C. and 200° C. The reaction mixture is preferably stirred, particularly when using a heterogeneous catalyst, and control of the temperature is by heat exchange.

Example 1

This example illustrates the procedure used in the other examples and involves the use of the prior art catalyst, for purposes of comparison.

In an argon filled dry box 0.31 g. (2 millimoles) of Stauffer hydrogen-reduced and activated titanium trichloride was placed in a clean, dry 500 ml. Paar-bottle. This bottle was capped after 5 ml. of dry hexane was added. This $TiCl_3$ was the violet modification, hydrogen reduced, and finely divided. To this was added 6 millimoles of triethyl aluminum (TEA) in 4 ml. of hexane and the mixture was stirred for 15 minutes at room temperature. Ninety ml. of hexane was added and the Paar-bottle was attached to a shaker and charged with Phillips polymerization grade propylene at 75 p.s.i.g. and vented. The bottle was charged again to 75 p.s.i. The concentration of $TiCl_3$ was 20 millimolar. The initial temperature maximum was 36° C. The reaction was difficult to control and was completed in only two hours. The polypropylene had an intrinsic viscosity of 3.35 dl./g. as determined in tetrahydronapthalene at 135° C. The polymer mixture was washed with methanol, filtered, placed in 500 ml. of refluxing 2% hydrochloric acid-isopropanol mixture, filtered, placed in 500 ml. of refluxing isopropanol, filtered and washed with three 200 ml. portions of hexane. The white polymer was dried at 50° C. under vacuum to constant weight. The polypropylene yield was 22 grams, the IRCR was 0.69, and heptane insolubility was 87%.

The abbreviation "IRCR" represents infrared crystallinity ratio, which is equal to the absorbance at $11.89\mu$ divided by the absorbance at $10.30\mu$, using a Baird-Atomic, Model 4–55 infrared spectrometer.

A similar reaction with a molar ratio of two parts $(C_2H_5)_3Al$ to one part of $TiCl_3$, a concentration of 78 millimoles of $TiCl_3$, an initial temperature of 50° C., and a time of 2 hours, other conditions and steps being the same as above, gave 50 grams of a polymer having an IRCR of 0.73.

By comparison with the present invention, given in other examples herein, it will be seen that modification of the conventional catalyst systems by the addition of a transition metal amide increases the crystallinity of the polymer and/or permits better control of the reaction temperature.

Example 2

Titanium trichloride, 0.31 g. (2 millimoles) was introduced into a Paar-bottle as in Example 1. To this was added 10 ml. of hexane and 2 millimoles of tetrakis diethylaminotitanium, as a pure liquid, and the mixture was stirred at room temperature for 15 minutes. Six millimoles of triethyl aluminum in 4 ml. of hexane was added, and the mixture was stirred for 15 minutes at room temperature. Eighty-five milliliters of hexane was added. $TiCl_3$ concentration was 20 millimolar and the remaining procedure for charging and polymerizing propylene was similar to that described in Example 1. Reaction time was 18 hours at room temperature. The yield was 2.7 g. of a white powder having an IRCR of 0.77, a heptane insoluble quantity of 96.6% and an intrinsic viscosity of 5.85 dl./g., determined in a manner similar to that of Example 1.

Example 3

An argon filled capped 500 ml. of Paar-bottle containing a "Teflon" covered magnetic stirring bar was used to react 3 millimoles of TDET, 5 ml. of hexane and 6 millimoles of triethylaluminum in 4 ml. of hexane. The homogeneous mixture was stirred for 5 minutes and 50 ml. of hexane added. The bottle was then attached to a Paar shaker, filled with polymerization grade ethylene to 60 p.s.i. and vented twice. The bottle was then filled to 60 p.s.i. and shaken for 3 days at a temperature of about 25° C. The polymer mixture was stirred with a 10% hydrochloric acid-methanol mixture, filtered, washed with methanol and dried in a vacuum drying oven at 50° C. The yield was 6 grams of a solid white polymer.

Example 4

13.5 millimoles of triethyl aluminum was added to 4.5 millimoles of TDET in 90 ml. of benzene. This homogeneous mixture was drawn into a 300 ml. autoclave filled with argon. Sixty-one grams of butadiene was added to the autoclave and the temperature raised to 70° C. The heat of polymerization maintained the autoclave at 72° C. for 3 hours. The reactor was then cooled to room temperature and methanol added to destroy the catalyst. The tough rubbery polymer obtained was cut into pieces, washed with methanol, placed in a refluxing isobutanol solvent, filtered, washed, with methanol, and dried in a vacuum drying oven. The yield obtained was 20 grams of a grey, tough rubber. Infrared analysis indicated no cis-1,4 structure and strong vinyl absorption.

Example 5

A heterogeneous catalyst comprising the combination of triethyl aluminum and undistilled TDET at a molecular ratio of 2 to 1, and lithium chloride, at a temperature of 190° C. polymerized butadiene and gave a tacky, elastic polymer containing a 1.68 to 1 ratio of vinyl to 1,4-trans unsaturation.

EXAMPLES 6–15

[Propylene pressure=75 p.s.i. Method A, unball-milled components; method B, ball-milled components; IRCR=infrared crystallinity ratio=absorbance $11.89\mu$/absorbance $10.30\mu$]

| Example | Catalyst Preparation | | | | | $TiCl_3$ conc., millimolar | Max. init. temp. (°C.) | Time, hrs. | Wt. polymer, grams | IRCR | Heptane solubility |
|---|---|---|---|---|---|---|---|---|---|---|---|
| | Method | Components, molar ratio | | | | | | | | | |
| | | TEA | $TiCl_3$ | TDET | $ZnCl_2$ | | | | | | |
| 6 | A | 14.0 | 4.0 | 2.8 | | 44.5 | 36 | 17.0 | 30 | 0.68 | 7.2 |
| 7 | A | 6.0 | 1.0 | 1.0 | | 10.0 | | 20.0 | 16 | 0.61 | |
| 8 | B | 3.0 | 1.0 | 1.0 | | 20.0 | 32 | 19.5 | 25 | 0.83 | |
| 9 | A | 2.5 | 1.0 | | | 20.0 | 38 | 18.0 | 23 | 0.69 | 17.0 |
| 10 | A | 3.0 | 1.0 | 1.0 | | 20.0 | 32 | 27.5 | 3.4 | 0.68 | |
| 11 | A | 2.0 | 1.0 | | | 20.0 | 54 | 1.0 | 32 | 0.63 | |
| 12 | A | 3.0 | 1.0 | 1.0 | 1.0 | 20.0 | 33 | 18.0 | 6.7 | 0.85 | 4.7 |
| 13 | B | 3.0 | 1.0 | 0.75 | | 20.0 | 33 | 21.5 | 13.0 | 0.80 | 9.9 |
| 14 | A | 7.3 | 2.0 | 2.0 | [1] 2.0 | 20.0 | 34 | 22.0 | 10.0 | 0.85 | |
| 15 | B | 3.0 | 1.0 | 1.0 | [2] 1.0 | 20.0 | 33 | 16.0 | 6.5 | 0.86 | |

[1] Added to ball-milled components. [2] Reacted with TEA and added to catalyst components.

The polymers of Examples 12 and 15 had intrinsic viscosities of 4.4 dl./g. and 4.8 dl./g., respectively.

Example 6

Propylene was polymerized by a procedure similar to the foregoing examples but with $(C_2H_5)_2AlCl$ as the reducing component, in a mole ratio of 2.45 to 1 $TiCl_3$ and 1 TDET, the concentration of $TiCl_3$ being 20 millimolar, gave a polypropylene having an IRCR of 0.78.

The polymers produced by the composition and methods of this invention can be used for filaments, fibers, molding powders, hot melt coatings, fluidized bed coatings, solvent coatings, organosols, plastisols, film sheet or slab manufacture by either calendering or extruding, flexible packaging material, wire coating compositions, paper coatings by extrusion or lamination, and in general for any utility of similar known polymers.

I claim:
1. A composition of matter derived from admixture of
   (A) a transition metal amide corresponding to the formula $M[N(R)_2]_x$, wherein M is a brittle transition metal having an atomic weight of less than 93 and selected from the group consisting of periodic Group IV–B, V–B, VI–B, and manganese, $x$ is the valence of the transition metal, and R is a hydrocarbon radical.
   (B) a material selected from the group consisting of
      (i) a Ziegler polymerization catalyst reducing component based upon a metallic element selected from the group consisting of periodic Group I–A, II–A, III–A, and IV–A
      (ii) a Ziegler polymerization catalyst reducing component as defined above and a Ziegler polymerization catalyst transition metal compound other than said amide, wherein the transition metal is a brittle transition metal having an atomic weight of less than 93 and selected from the group consisting of periodic Group IV–B, V–B, VI–B and manganese; and
   (C) a zinc compound selected from the group consisting of a zinc alkyl and zinc chloride.
2. The composition of claim 1 in which said reducing component contains a Group III–A metal.
3. The composition of claim 1 in which said brittle transition metal is titanium.
4. The composition of claim 1 in which said brittle transition metal is titanium and said reducing component contains a Group III–A metal.
5. The composition of claim 4 in which said Group III–A metal is aluminum, and the molar ratio of the aluminum compound to the titanium compound is between about 1:2 and 3:1.
6. The composition of claim 1 contained in a solvent.
7. The composition of claim 1 in which the molar ratio of the reducing component to the transition metal amide is between about 1:5 and 20:1.
8. The composition of claim 1, wherein said zinc compound is zinc chloride.
9. A process for polymerizing a polymerizable unsaturated organic monomer selected from the group consisting of ethylene, propylene, 1,3-butadiene, isoprene and chloroprene which comprises the step of contracting the monomer with a catalyst derived from an admixture of
   (A) a transition metal amide corresponding to the formula $M[N(R)_2]_x$, wherein M is a brittle transition metal having an atomic weight of less than 93 and selected from the group consisting of periodic Group IV–B, V–B, VI–B and manganese, $x$ is the valence of the transition metal, and R is a hydrocarbon radical,
   (B) a material selected from the group consisting of
      (i) a Ziegler polymerization catalyst reducing component based upon a metallic element selected from the group consisting of periodic Group I–A, II–A, III–A and IV–A
      (ii) a Ziegler polymerization catalyst reducing component as defined above and a Ziegler polymerization catalyst transition metal compound other than said amide, wherein the transition metal is a brittle transition metal having an atomic weight of less than 93 and selected from the group consisting of periodic Group IV–B, V–B, VI–B and manganese; and
   (C) a zinc compound selected from the group consisting of zinc chloride and zinc alkyls, and recovering the polymer so formed.
10. The process of claim 9 in which said reducing component is a Group III–A metal compound.
11. The process of claim 9 in which said transition metal is titanium.
12. The process of claim 10 in which said transition metal is titanium.
13. The process of claim 11 in which said Group III–A metal is aluminum.
14. The process of claim 9 in which an inert organic solvent is present in the reaction mixture.
15. The process of claim 14 in which the reaction mixture is homogeneous.
16. The process of claim 9, wherein said monomer is propylene and said catalyst component B is material (ii).
17. The process of claim 9, wherein said zinc compound is zinc chloride.
18. The process of claim 9 wherein said zinc compound is selected from the group consisting of zinc chloride and zinc alkyl and said catalyst component is material (ii).
19. The composition of claim 1, wherein said zinc compound is a zinc alkyl.
20. The process of claim 9, wherein said zinc compound is a zinc alkyl.

References Cited

UNITED STATES PATENTS 3,196,137  7/1965  Cain _____ 260—94.9

FOREIGN PATENTS 585,827  6/1960  Belgium.
877,661  9/1961  Great Britain.
281,312  2/1963  Spain.

OTHER REFERENCES

Shiihara et al.: Chemical Reviews, American Chemical Soc., 61, 1–31 (1961), pp. 18–19.

JOSEPH L. SCHOFER, Primary Examiner

M. KURTZMAN, Assistant Examiner

U.S. Cl. X.R.

252—426, 429; 260—80, 80.3, 80.6, 80.7, 80.8, 80.72, 80.76, 80.77, 80.78, 80.81, 82.1, 82.5, 83.5, 84.1, 85.3, 85.5, 85.7, 86.3, 86.7, 87.1, 87.3, 87.5, 87.7, 88.2, 88.3, 88.7, 89.5, 91.1, 91.5, 92.3, 92.8, 93.1, 94.1, 94.3, 94.8, 94.9